US008600125B2

(12) United States Patent
Kaufman et al.

(10) Patent No.: US 8,600,125 B2
(45) Date of Patent: Dec. 3, 2013

(54) SYSTEM AND METHOD FOR COMPUTER AIDED POLYP DETECTION (75) Inventors: Arie E. Kaufman, Plainview, NY (US); Wei Hong, Stony Brook, NY (US); Xianfeng Gu, Bethpage, NY (US); Feng Qiu, Stony Brook, NY (US)

(73) Assignee: The Research Foundation of State University of New York, Stony Brook, NY (US)

( * ) Notice: Subject to any disclaimer, the term of this patent is extended or adjusted under 35 U.S.C. 154(b) by 436 days.

(21) Appl. No.: 11/993,180

(22) PCT Filed: Jun. 21, 2006

(86) PCT No.: PCT/US2006/024072
§ 371 (c)(1),
(2), (4) Date: May 11, 2010

(87) PCT Pub. No.: WO2007/002146
PCT Pub. Date: Jan. 4, 2007

(65) Prior Publication Data
US 2010/0215226 A1    Aug. 26, 2010

Related U.S. Application Data

(60) Provisional application No. 60/692,903, filed on Jun. 22, 2005, provisional application No. 60/811,163, filed on Jun. 5, 2006.

(51) Int. Cl.
*G06K 9/00* (2006.01)
(52) U.S. Cl.
USPC ........... 382/128; 382/130; 382/131; 600/407; 600/416; 600/425; 600/431

(58) Field of Classification Search
USPC .......... 382/128, 130, 131; 600/407, 416, 425, 600/431
See application file for complete search history.

(56) References Cited

U.S. PATENT DOCUMENTS

| | | | | |
|---|---|---|---|---|
| 6,514,082 | B2 * | 2/2003 | Kaufman et al. | 434/262 |
| 6,697,538 | B1 * | 2/2004 | Angenent et al. | 382/285 |
| 6,928,314 | B1 * | 8/2005 | Johnson et al. | 600/407 |
| 7,260,250 | B2 * | 8/2007 | Summers et al. | 382/128 |
| 7,646,904 | B2 * | 1/2010 | Summers et al. | 382/128 |
| 7,672,497 | B2 * | 3/2010 | Nicponski | 382/128 |
| 2003/0132936 | A1 * | 7/2003 | Kreeger et al. | 345/420 |
| 2004/0228529 | A1 * | 11/2004 | Jerebko et al. | 382/173 |
| 2005/0152588 | A1 * | 7/2005 | Yoshida et al. | 382/128 |

* cited by examiner

*Primary Examiner* — Robert Chen
*Assistant Examiner* — Baisakhi Roy
(74) *Attorney, Agent, or Firm* — Dorsey & Whitney LLP (57) ABSTRACT

In the present methods, the automatic detection of polyps is converted into a 2D pattern recognition problem using conformal mapping and direct volume rendering. The colon surface is first segmented and extracted from the CT data set of the abdomen, which is then mapped to a 2D plane using conformal mapping. Ray casting is used to determine sub-surface density values and the flattened image is rendered using a volume rendering technique with a translucent electronic biopsy transfer function. Polyp candidates are detected by a clustering method which identifies regions of elevated sub-surface density. The potential for false positives is reduced by analyzing the volumetric shape and texture features of the polyp candidate regions.

17 Claims, 6 Drawing Sheets

SYSTEM AND METHOD FOR COMPUTER AIDED POLYP DETECTION

STATEMENT OF PRIORITY AND RELATED APPLICATIONS

This application claims priority to U.S. Provisional Application 60/692,903 filed on Jun. 22, 2005, entitled Systems and Methods for Computer Aided Polyp Detection, which is hereby incorporated by reference in its entirety and also claims priority to U.S. Provisional Application 60/811,163 filed on Jun. 5, 2006, entitled Improvements in Computer Aided Polyp Detection, which is hereby incorporated by reference in its entirety.

STATEMENT OF GOVERNMENT RIGHTS

This invention was made with government support under grant numbers CCR0306438 and CCF0448339 awarded by the National Science Foundation and grant numbers CA082402 and CA110186 awarded by the National Science Foundation. The government has certain rights in the invention.

BACKGROUND OF THE INVENTION

Colorectal cancer is the second leading cause of cancer-related deaths in the United States. Most colorectal cancers are believed to arise within benign adenomatous polyps that develop slowly over the course of many years. Accepted guidelines recommend the screening of adults who are at average risk for colorectal cancer, since the detection and removal of adenomas has been shown to reduce the incidence of cancer and cancer-related mortality. Some researchers have advocated screening programs to detect polyps with a diameter of less than one centimeter. Unfortunately, most people do not follow this advice because of the discomfort and inconvenience of the traditional optical colonoscopy. To encourage people to participate in screening programs, virtual colonoscopy (VC), also known as computed tomographic colonography (CTC), has been proposed and developed to detect colorectal neoplasms by using a computed tomography (CT) or MRI scan. Virtual colonoscopy is minimally invasive and does not require sedation or the insertion of a colonoscope. Virtual colonoscopy exploits computers to reconstruct a 3D model of the CT scans taken of the patient's abdomen, and create a virtual fly through of the colon to help radiologists navigate the model and make an accurate and efficient diagnosis. Previously known systems and methods for performing virtual colonoscopy are described, for example, in U.S. Pat. Nos. 5,971,767, 6,331,116 and 6,514,082, the disclosures of which are incorporated by reference in their entireties.

It has been demonstrated that the performance of a virtual colonoscopy compares favorably with that of a traditional optical colonoscopy. However, because of the complicated geometric and topological structure of colon models, inspecting the whole colon can be time consuming and prone to perceptual errors. For example, a single examination can typically generate 400-700 512×512 CT images and may require 10-15 minutes to be interpreted. The large amount of interpretation effort involved in the virtual colonoscopy screening procedure make a computer-aided detection (CAD) scheme highly desirable.

A CAD scheme that automatically detects the locations of the potential polyp candidates could substantially reduce the radiologists' interpretation time and increase their diagnostic performance with higher accuracy. However, the automatic detection of colonic polyps is a very challenging task because the polyps can have various sizes and shapes. Moreover, false positives (FPs) can arise since the colon exhibits numerous folds and residual colonic materials on the colon wall often have characteristics that mimic polyps. A practical CAD scheme for clinical purposes should have the ability to identify the true polyps and effectively eliminate or at least substantially reduce the number of false-positives.

It has been reported that the internal tissues of polyps have a slightly higher density and different texture than healthy tissues. See "Interactive Electronic Biopsy for 3d Virtual colonoscopy," Wan et al., SPIE Medical Imaging 4321: 483-488, 2001, the disclosure of which is hereby incorporated by reference in its entirety. However, these high density areas reside beneath the colon wall and cannot be seen during optical colonoscopy and are not identified in surface rendered virtual colonoscopy. It would be desirable to be able to use the increased sub-surface density characteristics of a polyp to provide improved CAD results.

SUMMARY OF THE INVENTION

A computer-based method of detecting polyps includes acquiring a 2D image dataset of a region of interest and transforming the 2D image dataset into a number voxels forming a volumetric representation of the region of interest. The voxels each have a value corresponding to a density of the object represented by the voxel. A surface of the region of interest is identified and the density of the object beneath the surface of the region of interest is determined. Suspicious regions are identified by locating sub-surface regions exhibiting a density higher than that of a surrounding region. The suspicious regions are then further evaluated to remove false-positive candidates. The step of evaluating the suspicious regions to reduce false positives can be determined in part by a shape index, a curvedness index and/or by a gradient of texture.

A computer-based method of detecting polyps includes the steps of acquiring a 2D image dataset of a region of interest and transforming the 2D image dataset into a plurality of voxels forming a volumetric representation of the region of interest. The voxels each have a value corresponding to a density of the object represented by the voxel. The method next extracts the surface of the object and transforms the extracted surface into a 2d planar representation of the surface. The sub-surface density values of the object are determined and the sub-surface density values are subjected to a clustering process to identify suspicious regions on the object. This method is particularly well suited for computer aided detection of polyps where the object is a colon.

The step of transforming the extracted surface can take place using an angle preserving conformal flattening process. A preferred conformal flattening process maps the colon surface to a substantially rectangular planar view.

The step of determining the sub-surface density values can take place using volumetric ray casting to integrate sub-surface density values along a projected ray. To easily distinguish different sub-surface density values, a transfer function can be applied to the integrated sub-surface density values to map density values into color values indicative of object density. In this way, the shape of the sub-surface high density regions can readily be determined to aid in the identification of malignancies.

The suspicious regions identified using sub-surface density can be subjected to further analysis to remove false-positive candidates. The evaluation of the suspicious regions can include evaluation of a shape index, a curvedness index, and a gradient of texture.

A graphical user-interface for a system for computer aided detection of polyps provides a computer display on which a number of windows of information or images are presented. The windows can include an endoscopic view of a colon lumen, at least one cross-sectional view of the colon, an electronic biopsy image of the colon, and a view of the colon identifying the location of suspicious regions, such as in the form of a number of bookmarks. Preferably, the electronic biopsy image employs a transfer function that provides for the presence of regions of elevated sub-surface density to be displayed in a color that is distinguishable from the surrounding region.

DETAILED DESCRIPTION OF PREFERABLE EMBODIMENTS

Figure 1:
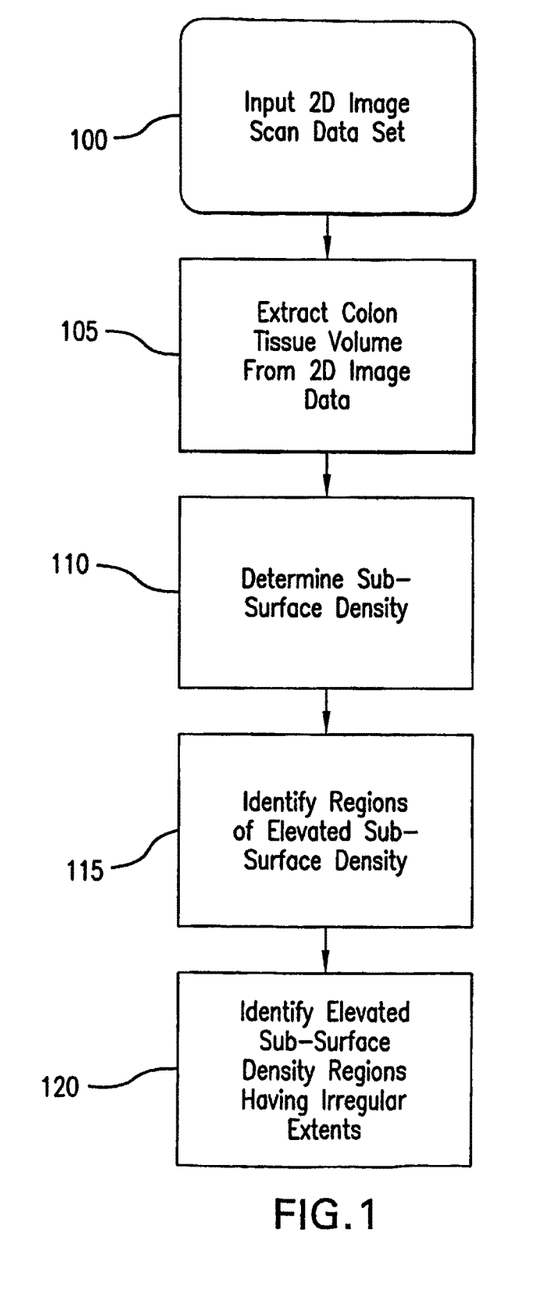
FIG. 1 is a simplified flow chart illustrating a preferred method of computer aided detection of polyps in accordance with the present invention.

An overview of a preferred embodiment of the present method for computer aided detection (CAD) of polyps is shown in the simplified flow chart of FIG. 1. The method assumes that appropriate 2D image data has been acquired, such as through the use of a spiral CT scan or other suitable method known in the art of virtual colonoscopy (step 100). From the 2D image data, the colon tissue volume is extracted in step 105, in a manner generally known in the art. After the colon tissue volume has been extracted, the sub-surface density can then be determined (step 110). As is explained in further detail below, the step of determining the sub-surface density is preferably performed on a conformal flattened mapping of the colon surface. The sub-surface density can be determined by integrating voxel values using a ray casting technique which steps through the surface of the colon wall into the depths of the colon tissue and accumulates the voxel values along the ray.

After the sub-surface density values are determined for the colon, regions of high density, are then identified in step 115. High density regions can be identified, for example, by applying a clustering algorithm, which is described in further detail below. After the high density sub-surface regions are identified, the characteristics of these regions are then examined to determine whether the regions are indicative of a polyp (step 120).

Figure 2A:
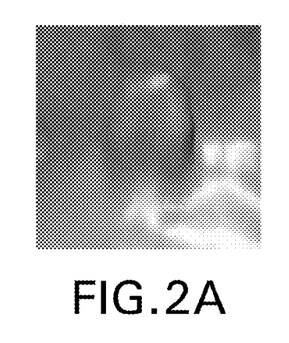
FIG. 2A is a 3D virtual colonoscopy rendering of a portion of retained stool within the colon lumen.
Figure 2B:
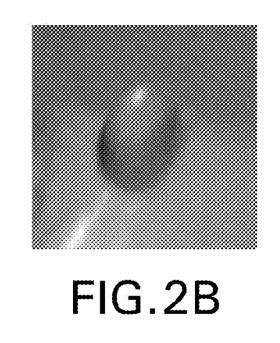
FIG. 2B is a 3D virtual colonoscopy rendering of a hyperplastic polyp identified within the colon lumen.

FIGS. 2A-2D and FIGS. 3A-3D illustrate the importance of using sub-surface density in the identification of polyp candidates. FIG. 2A is a 3-D virtual colonoscopy rendering of a region which has a shape characteristic consistent with a polyp, but is actually a portion of retained stool within the colon lumen. As shown in the electronic biopsy image of FIG. 3A, in which ray casting has been applied to determine the sub-surface density of the region of FIG. 2A, the retained stool is characterized by a region 310 which exhibits uniform high density with a sharp, consistent boundary. The rendering of the non-malignant hyperplastic polyp of FIG. 2B is characterized in the electronic biopsy image of FIG. 3B. Region 310 in FIG. 3B exhibits a sharp boundary and has no high density voxels. Region 310 would generally be shown in a different color from region 315 to distinguish the high density regions from the low density regions. For example, a transfer function mapping high density voxels to the color red and low density voxels to the color blue could be employed.

Figure 2C:
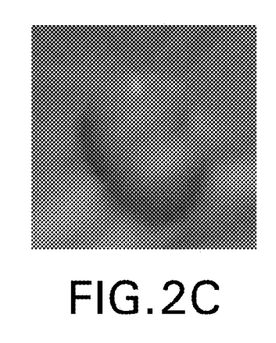
FIG. 2C is a 3D virtual colonoscopy rendering of an adenoma identified within the colon lumen.
Figure 2D:
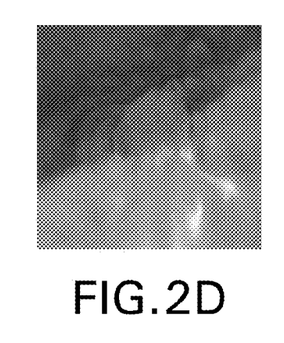
FIG. 2D is a 3D virtual colonoscopy rendering of a tubovillous adenoma identified within the colon lumen.
Figure 3A:
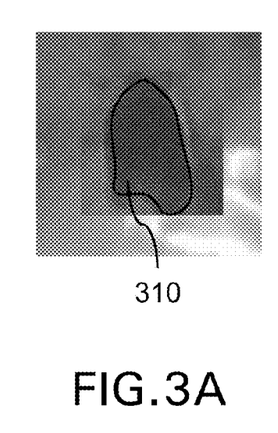
FIG. 3A is a 2D electronic biopsy image of the retained stool within the colon lumen illustrated in FIG. 2A.
Figure 3B:
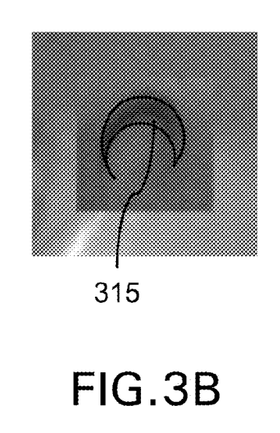
FIG. 3B is a 2D electronic biopsy image of the hyperplastic polyp identified within the colon lumen illustrated in FIG. 2B.
Figure 3C:
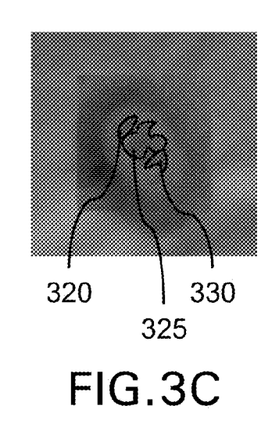
FIG. 3C is a 2D electronic biopsy image of an adenoma identified within the colon lumen illustrated in FIG. 2C.
Figure 3D:
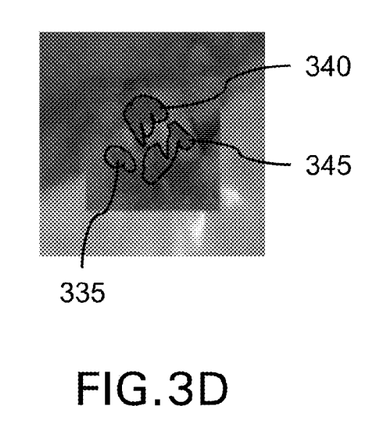
FIG. 3D is a 2D electronic biopsy image of the tubovillous adenoma identified within the colon lumen illustrated in FIG. 2D.

FIG. 2C is a 3D virtual colonoscopy rendered image of a malignant adenoma. In the corresponding electronic biopsy image of FIG. 3C, it can be seen that the sub-surface density of this region exhibits high density regions 320, 325, 330 which exhibit an irregular boundary. In a color rendering, these regions would be shown in the color indicative of high density, such as red. FIG. 2D illustrates a 3D virtual colonoscopy rendering of a tubulovillous adenoma. Unlike the adenoma of FIG. 2C, the malignant tubulovillous adenoma of FIG. 2D does not exhibit many of the expected 3D shape characteristics associated with a polyp. However, the sub-surface density exhibited in the electronic biopsy image of FIG. 4D shows irregular high density regions 335, 340 and 345 which are indicative of malignancy. Thus, while the polyp candidates observed in FIGS. 2A, 2B and 2C appear similar using traditional rendering, the sub-surface density characteristics clearly distinguish the malignancy from the non-malignant candidates.

Figure 4:
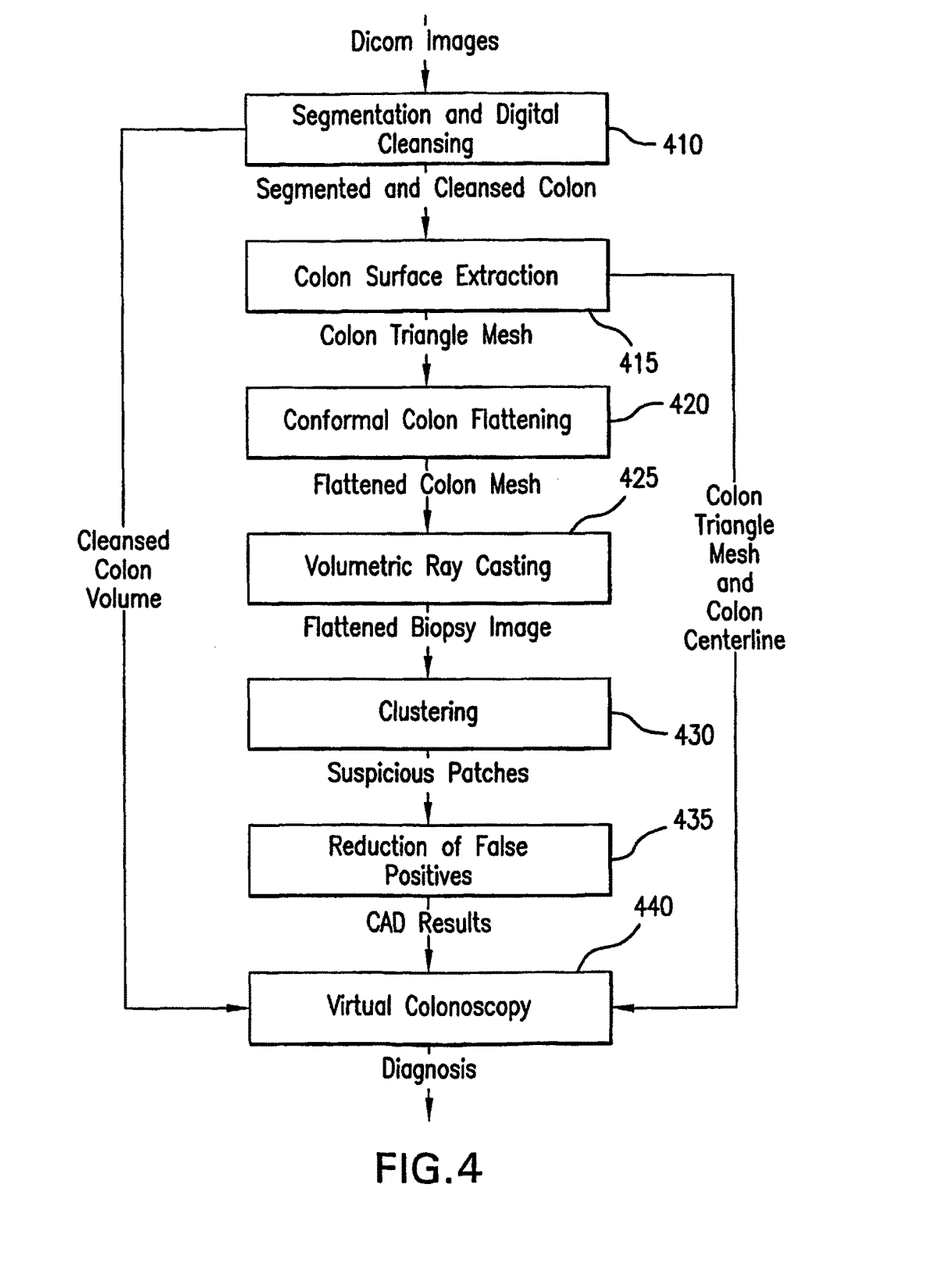
FIG. 4 is flow chart further illustrating a preferred method of computer aided detection of polyps in accordance with the present invention.

The method introduced in connection with FIG. 1 is further illustrated in the flow chart of FIG. 4. As shown in FIG. 4, the step of extracting the colon tissue volume of step 105, generally begins with segmentation of the image data and performing digital cleansing (step 410). Suitable techniques for performing segmentation and electronic colon cleansing are known, such as those discussed U.S. Pat. No. 6,514,082, entitled "System And Method For Performing A Three-Dimensional Examination With Collapse Correction," which is hereby incorporated by reference in its entirety.

Digital cleansing (step 110) is preferably performed by having a patient ingest an oral contrast agent prior to scanning such that colonic material is tagged by its contrast values. The colon can be electronically "cleansed" by removal of all tagged material, so that a virtual colon model can be constructed. A challenge presented in electronic colon cleansing is the removal of the interface layer between the air and the tagged colonic materials. Due to the partial volume effect, this layer covers the density values of colon tissues making it difficult to distinguish the voxels of colonic materials in this layer from that of the colon tissues. Another challenge encountered in electronic colon cleansing is the restoration of the CT density values of colon tissues in the enhanced mucosa layer and remove the portion with tagged colonic materials.

To address the challenges encountered in electronic cleansing, partial volume image segmentation is a desirable approach to identify the layers, quantify the material/tissue mixtures in the layers and restore the true CT density values of the colon mucosa layer. Preferably, an iterative partial volume segmentation algorithm, as described in the article "An Improved Electronic Colon Cleansing Method For Detection of Colonic Polyps by Virtual colonoscopy," by Wan et al., IEEE transactions on Biomedical Imaging 2006, which is incorporated herein in its entirety by reference, can be applied. In this method, the voxels in the colon lumen are classified as air, mixture of air with tissue, mixture of air with tagged materials, or mixture of tissue with tagged materials. The interface layer can then be identified by the dilation and erosion method. The equation used to restore the CT density values of the colon tissues in the enhanced mucosa layer can be found as described in Wan et al. After this step, a clean and segmented colon lumen is obtained.

Following segmentation of the colon in step 410, it is preferable to extract the colon surface (step 415) prior to employing a conformal virtual colon flattening algorithm (step 420). Topological noise that is introduced in modeling the colon lumen can make the flattening algorithm complex and introduce distortion. Therefore, prior to the steps of surface extraction and conformal surface flattening, it is desirable for the colon model to be processed to remove such topological noise and create a genus zero surface which is topologically simple.

Figure 5:
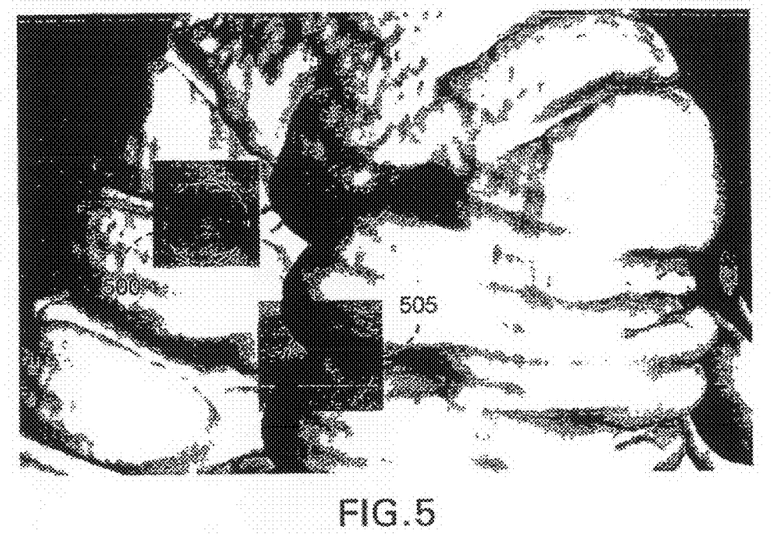
FIG. 5 is 3D image of a portion of a colon, illustrating the presence of "handles" bridging adjacent haustral folds in the colon.

One source of topological noise are so called "handles" which are shown regions bridging adjacent colon folds. Such handles are generally spurious and result from noise and inaccuracy in the reconstruction methods that are used to render the 3D image. FIG. 5 illustrates two examples of handles 505, 510. To address the topological complexity that is introduced by the presence of handles, it is preferable to identify the handles and then to remove them prior to surface extraction.

The present approach identifies handles by locating the shortest loop for each homotopy class. Intuitively, the topology of a closed oriented surface is determined by its number of handles (genus). Two closed curves are homotopic if they can deform to each other on the surface. Homotopic equivalence classes form the so-called homotopy group, which has finite generators, i.e. homotopy basis. Each handle corresponds to two generators. A handle can be removed by cutting the handle along one of its generators, and filling the resulting holes as shown in FIG. 6B.

In order to remove a handle, it is highly desirable to locate the shortest loop. One method of identifying the shortest loop, is to find the shortest path in the universal covering space. This converts the shortest loop problem to the shortest path problem. As illustrated in FIG. 5, the surfaces extracted from the segmented colon data sets usually only have a small number of handles 500, 505. To compute the shortest loop, the mesh can be simplified while preserving the topology of the finest mesh. In this regard, a finite portion of the universal covering space can be constructed using the coarsest mesh and the shortest loop computed in the universal covering space and lifted back to the finest mesh, which approximates the shortest loop on the finest mesh.

The main procedure of the present algorithm to remove handles is described as follows:
1. Compute the cut graph and homotopy basis.
2. Simplify the cut graph, then slice along the simplified cut graph to form the fundamental domain.
3. Glue finite copies of the fundamental domain coherently to construct a finite portion of the universal covering space.
4. Compute the shortest loop by finding the shortest path in the universal covering space.

After the shortest loop is obtained the mesh is sliced along the loop and the holes are filled to remove a handle. This procedure is repeated until all handles are removed.

Figure 6A:
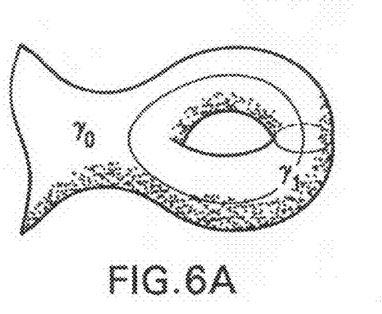
FIG. 6A is a schematic illustration of a loop formed in a surface, such as by the presence of a "handle."
Figure 6B:
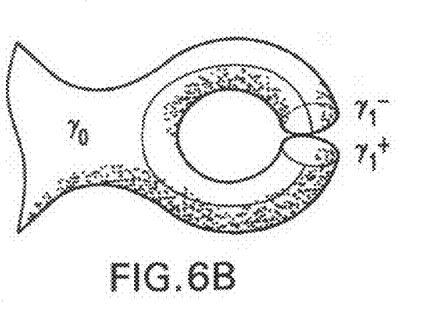
FIG. 6B is a schematic illustration of the use of "topological surgery" to remove the loop of FIG. 6A, thereby simplifying the surface topology.

As shown in FIG. 6A, a shortest loop method can be used to detect a handle. As shown in FIG. 6B, once the shortest loop is identified, the handle can be removed by introducing a slice in the loop and then closing the surfaces along the slice lines. This "topological surgery" opens the "handles" in the colon 3D image data and removes the resulting topological noise.

It is preferred to extract a topologically simple colon surface directly from the segmented colon data. In the present method, topological numbers corresponding to the compatible connectivity pair are used to test whether a voxel is a simple point. In this regard 6-connectivity can be used for the colon lumen, and 26-connectivity can be used for the background. If both are equal to one, the voxel can be considered simple. In order for a handle to be minimally cut, e the distance from the boundary can be used as a weight to control the region growing algorithm. In this case, the voxel with the largest distance from the colon wall is chosen using a region growing algorithm. This can be implemented efficiently using a priority queue.

In the present methods, an unsigned exact distance field can be computed using the segmented colon data. Next, the skeleton (i.e. centerline) of the colon is determined, such as by using the unsigned distance field. The centerline can then be used as the initial seeds set for a region growing process. A preferred topology preserving region growing algorithm is described as follows:
1. Mark the voxels of the input skeleton as Colon;
2. For each voxel of the skeleton, put its six neighboring voxels into a priority queue Q;
3. While Q is not empty do;
   (a) Let v be the top voxel in Q;
   (b) If v is a simple voxel, mark v as Colon and put its six neighboring voxels into Q;
   (c) The weight of v is decreased by 0.1;
   (d) If the weight of v is greater than 0.8, it is put into Q again.

After applying this region growing algorithm, the segmented colon is topologically simple. Preferably, an enhanced dual contour method can be used to extract a simplified smooth colon surface while preserving the topology of the finest resolution colon surface. After the colon surface extraction step 415, both the colon surface mesh with genus zero and the colon skeleton are obtained.

Following colon surface extraction, it is preferable to map the colon surface into a planar view in which the entire colon interior surface is readily observed. Virtual dissection in which the entire inner surface of the colon is displayed as a single 2D image is a known visualization technique for assisting in polyp detection. A known method of virtual dissection begins with uniformly resampling the colonic central path. At each sampling point, a cross section orthogonal to the path is computed. The central path is then straightened and the cross sections are unfolded and remapped into a new 3D volume. The isosurface is then extracted and rendered for polyp detection.

In mapping from a 3D structure to a planar view, it is known that distortion will result, either to the area being represented, the angles being represented, or both. Several methods for cartographic mapping of a 3D object into a planar view have been developed which feature either area preserving or angle preserving properties. A preferred method of colon flattening is based on Riemann surface theory, where the whole colon surface is conformally mapped to a 2D rectangle.

The present flattening algorithm is mainly based on the finite element method and uses piecewise linear functions defined on edges to approximate differential forms. In the following discussion, it is assumed the surfaces are represented by meshes using the halfedge data structure. We use f to denote a face, e for a halfedge, e- for the dual halfedge of e, ~M for mesh, M for the fundamental domain of M.

After topological noise removal, the surface is a closed genus zero surface. Because the zero surface has no holomorphic 1-form, a double covering method can used to construct a genus one surface. Two holes are first punched on the input surface. Then, a mesh M with two boundaries is obtained.

The algorithm to construct a closed genus one mesh is described as follows:

1. Make a copy of mesh M, denoted as M', such that M' has all vertices in M, if [v0, v1, v2] is a face in M, then [v1 v0, v2] is a face of M'.
2. Glue M and M' along their boundaries, if a halfedge [v0, v1] is on the boundary of M [v0, v1] ∈ ∂M, then [v1, v0] is on the boundary of M'. Glue [v0, v1] with [84 1, v0].

The resulting mesh is closed and symmetric and the two layers are coincident. It is noted that a general genus one surface can be conformally mapped to a planar parallelogram, but not a rectangle. However, since the present method obtains the genus one surface by the double covering method and the Riemann metric defined on the double covered surface is symmetric and each boundary where two surfaces are glued together is mapped to a straight line. Thus, using the present method, the denoised genus zero colon surface can be conformally mapped to a rectangle.

After determining the homotopy basis $\{\gamma_1, \gamma_2, \ldots, \gamma_{2g},\}$, the holomorphic 1-form basis can be readily determined as follows:

1. Select $\gamma_k$, compute $\omega_k:K_1 \rightarrow R$, form the boundary condition:

$$\sum_{e \in \gamma i} \dot{\omega}_k(e) = \frac{k}{i}, \omega_k(\partial f) = 0, \forall f \varepsilon K_2, \qquad (1)$$

where $$\delta_i^k = \begin{cases} 1: i = k \\ 0: i \neq k \end{cases}$$

$K_1$ is the edge set of M and $K_2$ is the face set of M.

2. Under the above linear constraints, compute $\omega_k$ minimizing the quadratic energy, $$E(\omega_k) = \sum_{e \in K_1} {}^2_k(e), \qquad (2)$$

using linear constrained least square method, where $k_e$ is the weight associated with each edge, suppose the angles in the adjacent faces against edge e are α, β, then $k_e = \frac{1}{2}$ (cot α+cot β). Solving this equation is equivalent to solving the Riemann-Cauchy equation using a finite element method. In the present implementation, the colon mesh is processed to remove noise and improve the quality of triangulations, such that the number of the obtuse triangles are minimized. As a result, the Laplacian matrix is positive and definite.

3. On face $[v_0, v_1, v_2]$, its normal n is computed first, and a unique vector v in the same plane of $v_0, v_1, v_2$ is obtained by solving the following equations:

$$\begin{cases} <v_1 - v_0, v> = \omega_k([v_1, v_0]) \\ <v_2 - v_1, v> = \omega_k([v_2, v_1]) \\ <n, v> = 0 \end{cases} \qquad (3)$$

Rotate v about n a right angle, $v^* = n \times v$, then define $$\omega_k^*([(v_i, v_j)]):<v_j - v_i, v^*>.$$

The harmonic 1-form basis is represented by $\{\omega_1, \omega_2, \ldots, \omega_{2g}\}$, and the holomorphic 1-form basis is given by $\{\omega_1 + i\omega_1^*, \omega_2 + i\omega_2^* \ldots, \omega_{2g} + i\omega_{2g}^*\}$.

The process of conformal parameterization is now described. Suppose we have selected a holomorphic 1-form $\omega: K1 \rightarrow C$, then we define a map $\phi: \tilde{M} \rightarrow C$ by integration. The algorithm to trace the horizontal trajectory and the vertical trajectory on $\phi$ (~M) is as follows:

1. Pick one vertex p ∈ ~M as the base vertex.
2. For any vertex q ∈ ~M, find the shortest path γ ∈ ~M connecting p to q.
3. Map q to the complex plane by $$\phi(q) = \sum_{e \in \gamma} \omega(e).$$

Figure 7A:
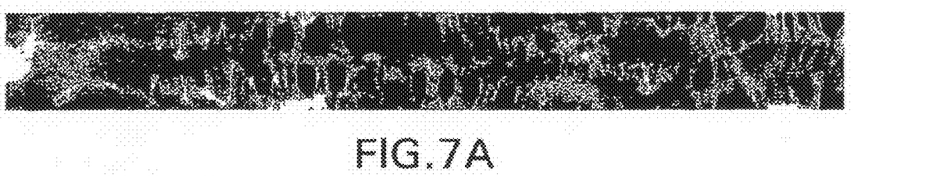
FIG. 7A is an electronic biopsy image resulting from conformal flattening of the colon wall and applying volumetric ray casting to determine sub-surface density.
Figure 7B:
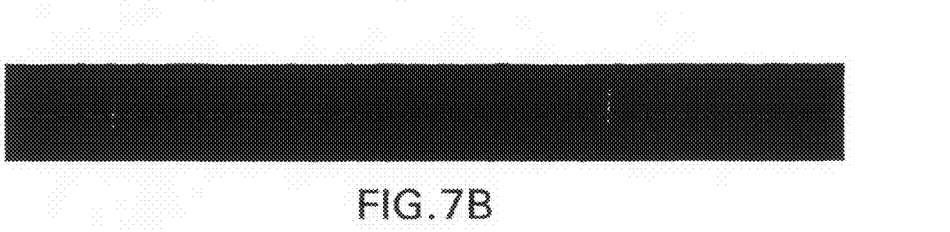
FIG. 7B is an image resulting from the application of a clustering algorithm to the electronic biopsy image of FIG. 7A in which a number of polyp candidates are identified.
Figure 7C:
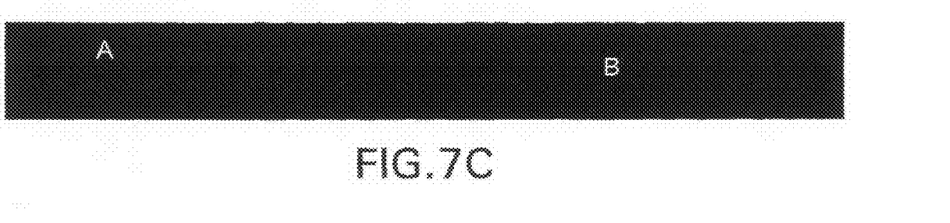
FIG. 7C is an image illustrating polyp candidates from the clustered image data remaining after the application of processes to remove false positives from the set of polyp candidates identified in FIG. 6B.

4. Pick a vertex p ∈M, trace the horizontal line γ on the plane region $\phi$ (~M) through $\phi(p)$ as shown in FIG. 7. If γ hits the boundary of $\phi$(~M) at the point $\phi(q)$, q must be in the cut graph Γ, then there are two points $q^+, q^-$ on the boundary of ~M, ∂~M. Assume γ hits $\phi(q^+)$, then continue to trace the horizontal line started from $\phi(q^-)$, until the trace returns to the starting point $\phi(p)$. The horizontal trajectory is $\phi^{-1}(\gamma)$.
5. Trace the vertical trajectory similar to step 4.
6. The new cut graph Γ is the union of the horizontal and vertical trajectories. Cut the surface along to get ~Γ, to get ~M', and compute ~$\phi$. Then ~$\phi$(~M') is a rectangle, ~$\phi$ is a conformal map.

A process of virtual camera registration is now described. To perform the ray-casting algorithm, the ray direction is determined for each vertex of the 3D colon surface. In the present method, a number of virtual cameras are uniformly placed on the central path of the colon. The ray direction of a vertex is then determined by the nearest camera to that vertex. The present method employs a camera registration algorithm that starts with approximating the central path with a B-spline and resampling it into uniform intervals. Each sampling point represents a camera. Each vertex is then registered with a sampling point on the central path. The registration procedure is implemented efficiently by first dividing the 3D colon surface and central path into a number of segments along the length of the colon. The registration is then performed between the correspondent segments of colon and the central path.

The division of the 3D colon can be performed by classifying the vertices of the flattened 2D mesh into N uniform segments based on their height. As a consequence, the vertices of the 3D colon mesh will also be divided into N segments. Next, N−1 horizontal lines can be traced on the flattened 2D mesh, which will uniformly divide the 2D mesh into N segments. Each traced horizontal line corresponds to a cross contour on the 3D mesh. For each horizontal line, the intersection points of the horizontal line and edges intersecting with it are determined. For each intersection point, the corresponding 3D vertex of the 3D colon mesh is then interpolated. The centroid of these interpolated 3D vertices is computed and registered with a sampling point of the central path.

The central path can also be divided into N segments, and each segment of the 3D colon mesh corresponds to a segment of the central path. Although the division of the 3D colon surface and the central path is not as uniform as that of the 2D mesh, this does not significantly affect the accuracy of the camera registration. For each vertex of a colon surface segment, the nearest sampling point in its corresponding central path segment and the neighboring two segments is determined.

The distortion arising from mapping the 3D geometry of the colon surface to the parametric rectangle, which is measured by harmonic energy, is minimized by the present method. Because this algorithm is angle preserving, the shape of a polyp is largely preserved in the 2D view. This is beneficial since colonic polyps are generally characterized as having have an elliptic curvature of the peak subtype, i.e., the shape at the top section of a regular polyp (toward the colon wall) is more likely to be a spherical cap. Because of the local shape preservation of the present colon flattening algorithm, the elliptic shape of colonic polyps is largely preserved in the flattened image.

It is noted that the present conformal colon flattening approach does exhibit some area distortion. Consequently, polyp dimensions can not be accurately measured on the 2D flattened colon image. However, since the approach maintains a one-to-one mapping between the 3D vertices and 2D vertices of the colon mesh, polyp dimensions can still be measured in the 3D domain.

In step 115 of FIG. 1, the sub-surface density values of the colon are identified. Preferably, this is accomplished using an electronic biopsy technique that employs a volume rendering algorithm to present the information from the interior colon wall on a 2D image.

Referring to FIG. 4, one method to extract the sub-surface density is to apply volumetric ray casing (step 425) to the conformal flattened rendering of the colon surface. A constrained volumetric ray casting algorithm can be used to generate a 2D biopsy image, such as shown in FIG. 7A, from a conformally flattened colon volume. A canonical volumetric ray casting algorithm projects a ray for each pixel on the image plane. The direction of the ray is defined by the positions of the viewpoint and the pixel. When the ray hits the boundary of the volume, the ray starts to accumulate voxel color or intensity values, which are indicative of density, while stepping through the surface inside the volume of the region. Since the colon wall is generally represented with a mesh, the first intersection points can be computed by simply projecting the mesh onto the image plane. Each vertex of the mesh of the flattened colon has a 3D coordinate in the volume space. The coordinate of the first intersection point of each pixel is linearly interpolated from the three vertices of the triangle with which the ray intersects.

Because flattening the colon into a 2D mesh is a nonlinear transformation, no single point can be defined as the viewpoint in the volume space for all rays. Therefore, the gradient at the intersection point is generally defined as the direction of the ray. Because only a thin layer beneath the colon surface is of interest, each ray can be set to only traverse a limited number of steps, such as about 40 steps, below the surface. Because the colon wall protrudes into the lumen, some rays may enter the colon lumen again. In this event, such rays can be terminated in the ray casting algorithm using the segmentation information of the colon lumen when an "air" voxel is encountered. In this manner high resolution biopsy images can be efficiently generated with the thin layer beneath the colon wall being super-sampled.

Following the sub-surface density determination, or "electronic biopsy" of step 110, it is desirable to identify regions of high-sub-surface density 115. Referring to FIG. 4, following volumetric ray casting of step 425, regions exhibiting similar color and or intensity features will be apparent in a contiguous area in several regions of the 2D electronic biopsy image. Several of these regions represent areas of higher sub-surface density. By classifying these features within a certain range in the 2D image, suspicious regions can be identified which are indicative of polyp candidates. FIG. 7B illustrates the result of applying a suitable clustering algorithm to the electronic biopsy image data of FIG. 7A.

In the electronic biopsy image of FIG. 7A, the RGB color values of the given pixel and its twelve neighboring pixels can be used to generate a 39-dimensional local feature vector. Consequently, a high resolution flattened electronic biopsy image can be used where each pixel has a 39-dimensional local feature vector.

To reduce the computing burden associated with the large number of local feature vectors, a feature analysis of the local vector series can be used. For example, a principal component analysis (PCA) can be applied to the local vector series to determine the dimension of the feature vectors and the associated orthogonal transformation matrix (i.e., the K-L transformation matrix). The PCA applied to training data sets has shown that a reasonable dimension of the feature vectors is 7, where the summation of the first 7 principal components variances is more than 96.5% of the total variance.

The K-L transformation matrix can be applied to the local vector series belonging to polyps identified on the 2D flattened electronic biopsy images. In the K-L domain, the feature vectors are formed by the first 7 principal components from the transformed vector series. The mean vector of these feature vectors is computed and used as the representative vector V of the feature vectors belonging to polyps. The square root of the variance of these feature vectors is also computed and used as a threshold T for vector similarity in the clustering.

For a given testing data set, the representative vector V and similarity threshold T can be used to classify the feature vectors in the K-L domain. If the Euclidean distance between a feature vector and V is less than T, the corresponding pixel is classified as belonging to a polyp. A 2D image can be generated where the pixels classified belonging to a polyp are highlighted, such as by showing these pixels in a different color. The colored regions in such a 2D image will represent highly suspicious regions for polyps, indicating that the physicians should observe these areas in the 3D view very carefully.

After applications the clustering algorithm, the pixels classified as belonging to a polyp can be marked. A labeling algorithm can then be applied to extract the connected components on this image. To reduce false-positives, a minimum polyp diameter, such as 5 mm, can be established. A component whose pixel number is below such a threshold is classified as a false-positive finding. Consequently, many small components can be removed.

False-positive findings can be further reduced by analyzing a number of criteria such as the shape index, curvedness features and volumetric texture features of the polyp candidates. The shape index is a measure of the shape. Every distinct shape, except for the plane, corresponds to a unique value of the shape index. The shape index values increase smoothly from the top section to the bottom peripheral region of a polyp on the colon wall inner surface. Curvedness represents how gently curved the surface is. Curvedness is a dual feature to the shape index in that the shape index measures which shape the local neighborhood of a voxel has, whereas the curvedness measures how much shape the neighborhood includes. The curvedness also provides scale information: a large negative value implies a very gentle change, whereas a large positive value implies a very sharp edge. In the 3D volumetric data, polyps generally appear as bulbous, cap-like structures adhering to the colonic wall, with small to medium curvedness, whereas folds appear as elongated, ridge like structures with large curvedness. The colonic walls appear as nearly flat, cup-like structures with small curvedness. Therefore, the shape index and the curvedness can effectively differentiate polyps from folds and colonic walls.

Because of the partial volume effect, the soft-tissue density values within a polyp tend to smoothly increase from the colonic air toward the center of the polyp. Therefore, most density gradient vectors within a polyp tend to point toward the polyp center. A gradient concentration feature that characterizes the overall direction of the gradient vectors around a point can be used for further reducing false-positives. In the preferred pipeline method, shape index, curvedness, and gradient concentration are each applied on the suspicious patches to further reduce the false-positives.

Figure 8:
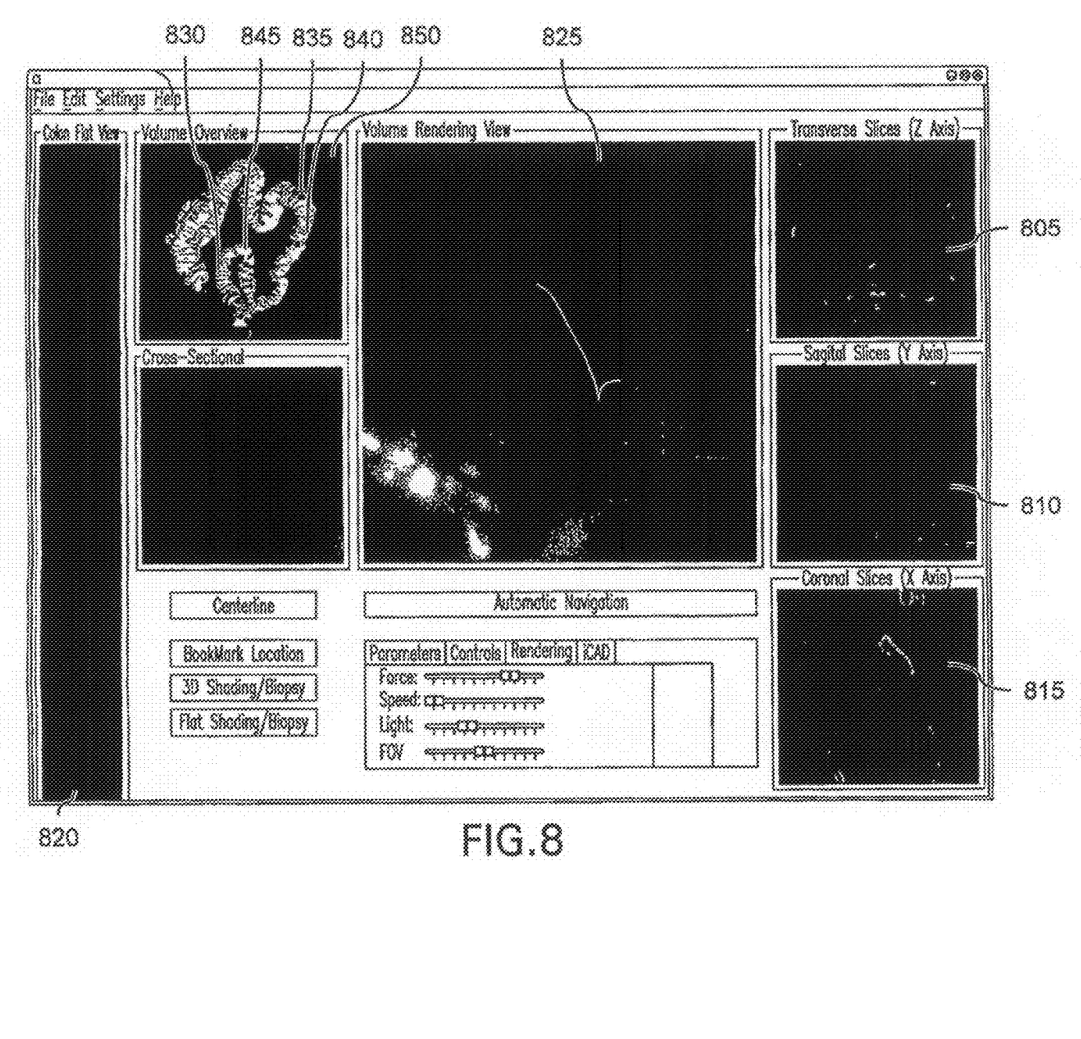
FIG. 8 is an illustration of a user interface display suitable for use in the present CAD methods.

To assist in the identification and analysis of potential polyps, it is desirable to have an intuitive and informative display of the information being presented. An interactive graphical user interface (GUI) shown in FIG. 8 is suitable for use in the present invention and provides multiple views of the colon CT data. For example, the GUI of FIG. 8 can simultaneously provide 2D mutually perpendicular slice views of the region of interest oriented in the axial 805, sagittal 810 and coronal 815 alignment. A flattened colon image 820, such as provided by the present electronic biopsy image technique, can be displayed as well, as shown on the left hand side of FIG. 8. Also provided in the GUI is a 3D volume rendered endoscopic view 825, generated, for example, using the above described polygon assisted algorithm. An outside overview of the patient's colon 830 with bookmarks 835, 840, 845, of suspicious polyps and a zoom-in view 850 are shown on the left of the endoscopic view in FIG. 8 is desirable to quickly navigate to each of the suspicious regions.

The displayed 2D and 3D images are correlated and interlinked so that position in 3D is overlaid on the 2D images and position of 2D slices and flattened colon image can be overlaid on the 3D images. The provision of multiple, synchronized views, as illustrated in FIG. 8, provides a quick and simple mechanism to easily analyze suspicious polyps in both 2D and 3D image views.

When navigating or flying through the colon interior, the colon wall can be rendered with a direct volume rendering method. Because of the large size of the colon volume data and the inherent complexity of volume rendering, it is very hard to achieve interactive frame rates with a software implementation. 3D texture-based volume rendering is a popular volume rendering method that can achieve realtime speed on commodity graphics hardware or graphics processing unit (GPU). However, the rays shot from the image plane have different sampling rates due to the planar proxy geometry. Ray casting has been implemented on the GPU, which has a coherent sampling rate for all rays.

To achieve interactive speed, two common acceleration techniques known in the art, empty-space skipping and early ray termination, can be used. Polygonal mesh can also be used to help direct volume rendering. In this case, the polygonal mesh representing the object boundary is extracted from the volume, such as with the marching cubes method. The mesh is projected onto the image plane for calculating the entry points of rays, and the empty space between the image plane and the object boundary is skipped. This method is very efficient because the GPU is very efficient in rasterizing triangles onto the image plane.

In the present pipeline methodology, the polygonal mesh of the colon wall is generated in the second step. Each vertex is associated with its coordinates in volume texture space. Preferably, the present algorithm operates in two passes. In the first pass, the mesh is rendered and the rasterization hardware interpolates the texture coordinates for each fragment. In this first pass, the depth test is enabled so that only the nearest intersection points are preserved in the frame buffer. In the second pass, a fragment shader reads back the intersection point for each pixel on the image plane and a standard ray casting is performed from this point.

Preferably, the present CAD methods are integrated into a comprehensive virtual colonoscopy system. A preferred system provides three modes: navigation mode, overview mode, and flattened colon image mode. In the navigation mode, the suspicious polyps can be highlighted to attract the attention of the radiologists during navigation and provides for the radiologists to place "bookmarks" during the navigation. A bookmark can be stored on the flattened colon image, which is more convenient than putting bookmarks on the centerline. In the overview mode, radiologists can sequentially or randomly go through all bookmarks of suspicious polyps automatically provided by the present CAD pipeline method. In the flattened colon image mode, radiologists can directly inspect the flattened colon image.

The present polyp detection pipeline can be implemented in C/C++ and run on a 3.6 GHz Pentium IV PC running Windows XP with 3G RAM and a NVIDIA Quadro 4500 graphics board.

The present method for polyp detection uses digital cleansing, volume rendering, and conformal colon flattening techniques. The malignant polyps in the electronic biopsy images have different densities compared with normal tissues and residual stool. The false-positives among the polyp candidates are further reduced by shape analysis and 3D texture analysis, which are only performed on the polyp candidates. The present system is much faster than previous reported methods. Preliminary experimental results demonstrate that the present system is very efficient for the detection of polyps. The CAD results are stored using 2D images, which are easily integrated into the present virtual colonoscopy system to highlight the polyp locations on the colon wall during navigation.

What is claimed is:

1. A computer-based method of detecting polyps comprising:
   acquiring a 2D image dataset of a region of interest;
   transforming the 2D image dataset into a plurality of voxels forming a volumetric representation of the region of interest, wherein the voxels each have a value corresponding to a density of an object represented by the voxel;
   identifying a surface of the region of interest;
   determining a density of the object beneath the surface of the region of interest;
   identifying suspicious regions by identifying internal sub-surface regions exhibiting a density higher than that of a surrounding region; and
   evaluating the suspicious regions to remove false-positive candidates by analyzing at least one of a shape or a texture of the identified internal sub-surface regions.

2. The method of claim 1 wherein the step of evaluating the suspicious region is determined in part by a shape index.

3. The method of claim 1 wherein the step of evaluating the suspicious region is determined in part by a curvedness index.

4. The method of claim 1 wherein the step of evaluating the suspicious region is determined in part by a gradient of texture.

5. A computer-based method of detecting polyps comprising:
   acquiring a 2D image dataset of a region of interest;
   transforming the 2D image dataset into a plurality of voxels forming a volumetric representation of the region of interest, wherein the voxels each have a value corresponding to a density of an object represented by the voxel;
   extracting a surface of the object;
   transforming the extracted surface into a 2D planar representation of the surface;
   determining sub-surface density values of the object;
   clustering the sub-surface density values of internal sub-surface regions to identify suspicious regions on the object; and
   evaluating the suspicious regions to remove false-positive candidates by analyzing at least one of a shape or a texture of the internal sub-surface regions.

6. The computer based method of detecting polyps of claim 5, wherein the object is a colon.

7. The computer based method of detecting polyps of claim 6, wherein the step of transforming the extracted surface further comprises the use of an angle preserving conformal flattening process.

8. The computer based method of detecting polyps of claim 7, wherein the conformal flattening process maps the colon surface to a substantially rectangular planar view.

9. The computer based method of detecting polyps of claim 8, wherein the step of determining sub-surface density values further comprises volumetric ray casting to integrate sub-surface density values.

10. The computer based method of detecting polyps of claim 9, wherein the step of determining sub-surface density values further comprises a step of applying a transfer function to the integrated sub-surface density values to map density values into color values indicative of object density.

11. The method of claim 5 wherein the step of evaluating the suspicious region is determined in part by a shape index.

12. The method of claim 5 wherein the step of evaluating the suspicious region is determined in part by a curvedness index.

13. The method of claim 5 wherein the step of evaluating the suspicious region is determined in part by a gradient of texture.

14. A graphical user-interface for a system for computer aided detection of polyps, the graphical user interface comprising a computer display, said display having a plurality of display windows comprising:
   an endoscopic view of a colon lumen;
   at least one cross-sectional view of the colon;
   an electronic biopsy image of the colon;
   a view of the colon identifying a presence of internal sub-surface regions of elevated sub-surface density as a location of suspicious regions; and
   evaluating the suspicious regions to remove false-positive candidates by analyzing at least one of a shape or a texture of the identified internal sub-surface regions.

15. The graphical user-interface for a system for computer aided detection of polyps of claim 14, wherein the electronic biopsy image displays the presence of regions of elevated sub-surface density in a color that is distinguishable from the surrounding region.

16. The graphical user interface for a system for computer aided detection of polyps of claim 14, wherein the plurality of display windows are synchronized.

17. The graphical user interface for a system for computer aided detection of polyps of claim 14, wherein the plurality of display windows further includes a flattened 2D conformal mapping of the colon.

* * * * *